(12) United States Patent
Oiwa et al.

(10) Patent No.: US 10,273,871 B2
(45) Date of Patent: Apr. 30, 2019

(54) AIR INTAKE DEVICE AND VALVE

(71) Applicant: AISIN SEIKI KABUSHIKI KAISHA, Kariya-shi, Aichi-ken (JP)

(72) Inventors: Toshiyuki Oiwa, Handa (JP); Kyohei Ninomiya, Kariya (JP); Masato Oishi, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 154 days.

(21) Appl. No.: 15/203,003

(22) Filed: Jul. 6, 2016

(65) Prior Publication Data

US 2017/0009641 A1    Jan. 12, 2017

(30) Foreign Application Priority Data

Jul. 7, 2015    (JP) .................................. 2015-136245

(51) Int. Cl.

| | |
|---|---|
| *F16K 1/22* | (2006.01) |
| *F16K 1/20* | (2006.01) |
| *F02B 27/02* | (2006.01) |
| *F02D 9/10* | (2006.01) |
| *F16K 1/226* | (2006.01) |

(52) U.S. Cl.
CPC ...... *F02B 27/0215* (2013.01); *F02B 27/0263* (2013.01); *F02D 9/1015* (2013.01); *F02D 9/1095* (2013.01); *F16K 1/2261* (2013.01); *Y02T 10/146* (2013.01)

(58) Field of Classification Search
CPC .... F16K 1/2261; F16K 1/2285; F16K 1/2042; F16K 1/205; F02B 27/0273; F02B 31/06; F02D 9/1015; F02M 26/70

USPC ............. 123/190.17, 336, 337; 251/173, 306
See application file for complete search history.

(56) References Cited

U.S. PATENT DOCUMENTS

| | | | | |
|---|---|---|---|---|
| 3,127,182 | A * | 3/1964 | Wardleigh | ........... F16J 15/3208 251/306 |
| 3,549,123 | A * | 12/1970 | Bell | ...................... F16K 1/2261 251/306 |
| 4,044,994 | A * | 8/1977 | Priese | ...................... F16J 15/32 251/172 |
| 9,624,838 | B2 * | 4/2017 | Oiwa | .................. F02B 27/0215 |

(Continued)

FOREIGN PATENT DOCUMENTS

| | | | | |
|---|---|---|---|---|
| DE | | 2817355 A1 * | 12/1978 | ........... F16K 1/2261 |
| FR | | 1008139 A * | 5/1952 | ........... F16K 1/2285 |

(Continued)

OTHER PUBLICATIONS

Japanese Office Action dated Mar. 12, 2019 in corresponding JP Application No. 2015-136245 and English translation (7 pages).

*Primary Examiner* — Reinaldo Sanchez-Medina
*Assistant Examiner* — Hailey K Do
(74) *Attorney, Agent, or Firm* — Buchanan Ingersoll & Rooney PC

(57) ABSTRACT

An air intake device includes: an air intake port; and a valve that includes an elastically deformable seal portion disposed in Ha side end portion, and switches between flow paths of the air intake port by being turned around a turning shaft, wherein the side end portion of the valve is provided with a curved side end portion that extends from one end portion side to the other end portion side along an extension direction of the turning shaft while being curved.

6 Claims, 11 Drawing Sheets

(56) References Cited

U.S. PATENT DOCUMENTS

2015/0047595 A1\* 2/2015 Oiwa ................. F02M 35/1036
123/184.55
2015/0330515 A1 11/2015 Oiwa et al.

FOREIGN PATENT DOCUMENTS

| JP | 2010-001847 A | 1/2010 | |
|----|---|---|---|
| JP | 2011064140 A | 3/2011 | |
| JP | WO 2014080689 A1 \* | 5/2014 | .......... F02B 27/0215 |
| JP | 2014-101797 A | 6/2014 | |

\* cited by examiner

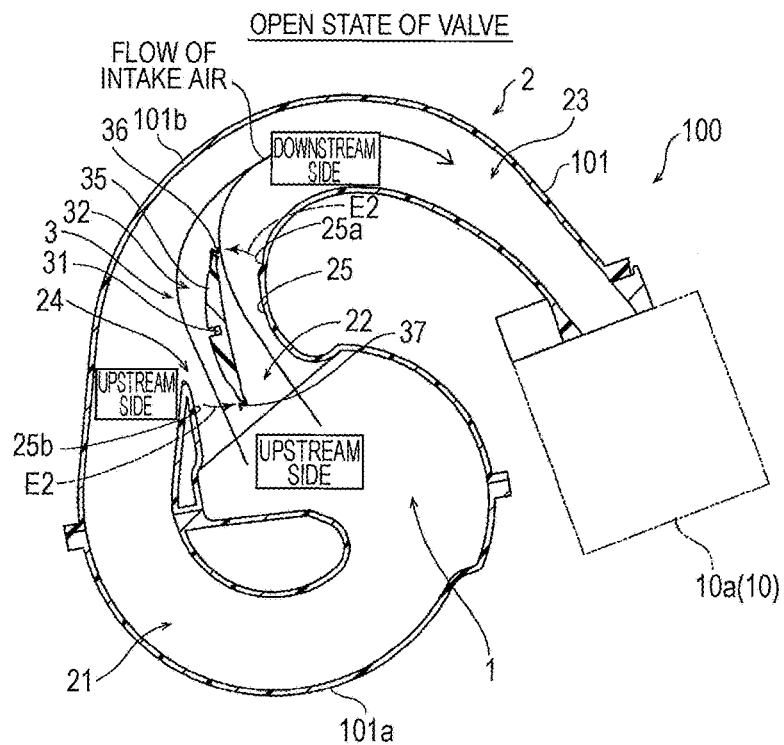
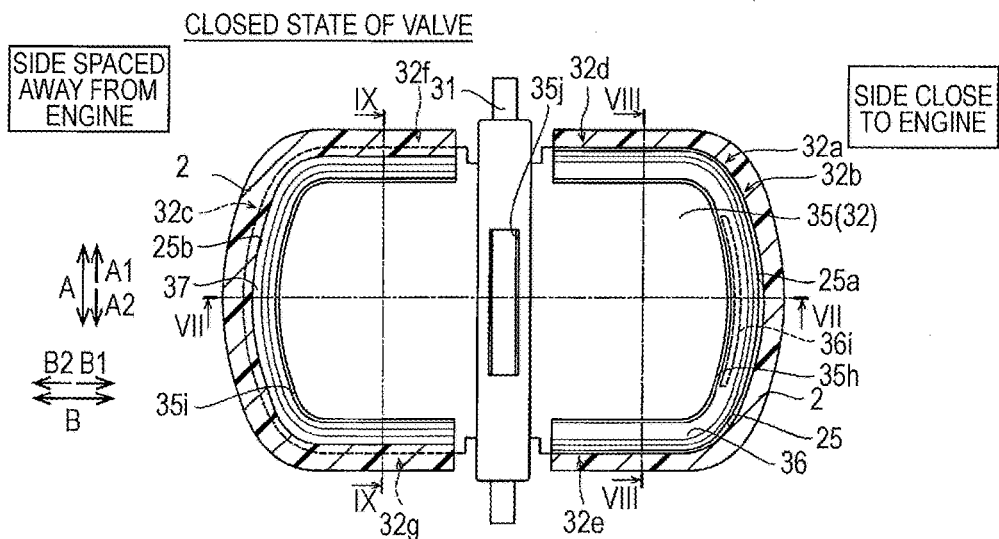

SECTION TAKEN ALONG LINE XII-XII

SECTION TAKEN ALONG LINE XIII-XIII

SECOND MODIFICATION EXAMPLE

AIR INTAKE DEVICE AND VALVE

CROSS REFERENCE TO RELATED APPLICATIONS

This application is based on and claims priority under 35 U.S.C. § 119 to Japanese Patent Application 2015-136245, filed on Jul. 7, 2015, the entire contents of which are incorporated herein by reference.

TECHNICAL FIELD

This disclosure relates to an air intake device and a valve.

BACKGROUND DISCUSSION

In the related art, an air intake device including a valve, which can be turned to switch between flow paths of an air intake port, is known (for example, refer to JP 2010-1847A (Reference 1)).

Reference 1 discloses a variable air intake device including an air intake port, and a valve that switches the flow path of the air intake port between a short port, the passage length of which is short, and a long port, the passage length of which is long. The valve of the variable air intake device includes a rectangular valve body including rounded corners, and a seal lip that is joined to a side end portion of the rectangular valve body and is made of rubber. Specifically, the valve body is formed into a rectangular shape including four sides which are straight except for the rounded corners. A side end portion of the seal lip is provided with a contact portion that is formed to extend from the vicinity of a side end portion of the valve toward an opening direction of the valve, and is in contact with an inner wall surface of the air intake port in a state where the contact portion is elastically deformed. The contact portion comes into contact with the inner wall surface of the air intake port such that a gap between the valve and the air intake port is sealed. The contact portion (side end portion) of the seal lip is formed straight except for a portion corresponding to the corners of the valve such that the contact portion corresponds to the rectangular valve body including the rounded corners.

As a result of in-depth study, the inventors have found that the variable air intake device disclosed in Reference 1 has a problem in that external force caused by the flow of intake air or the like is applied to the contact portion of the seal lip, and then the contact portion is deformed. As a result, due to insufficient contact between the deformed contact portion and the air intake port, in the air intake device, the gap between the air intake port and the valve is not sufficiently sealed.

SUMMARY

Thus, a need exists for an air intake device and a valve which are not susceptible to the drawback mentioned above.

As a result of further study, in order to achieve the object, the inventors have come up with the following configuration. That is, an air intake device according to a first aspect of this disclosure includes: an air intake port; and a valve that includes an elastically deformable seal portion disposed in a side end portion, and switches between flow paths of the air intake port by being turned around a turning shaft. The side end portion of the valve is provided with a curved side end portion that extends from one end portion side to the other end portion side along an extension direction of the turning shaft while being curved.

A valve according to a second aspect of this disclosure can be turned around a turning shaft and includes: an elastically deformable seal portion that is disposed in a side end portion of the valve. The side end portion of the valve is provided with a curved side end portion that extends from one end portion side to the other end portion side along an extension direction of the turning shaft while being curved.

BRIEF DESCRIPTION OF THE DRAWINGS

The foregoing and additional features and characteristics of this disclosure will become more apparent from the following detailed description considered with the reference to the accompanying drawings, wherein:

FIG. 4 is a sectional view illustrating an open state of the valve of the air intake device in the first embodiment disclosed here;

FIG. 5 is a top view illustrating the closed valve and an inner wall surface of the air intake device in the first embodiment disclosed here;

DETAILED DESCRIPTION

Hereinafter, embodiments disclosed here will be described with reference to the accompanying drawings.

First Embodiment

Structure of Air Intake Device

Figure 1:
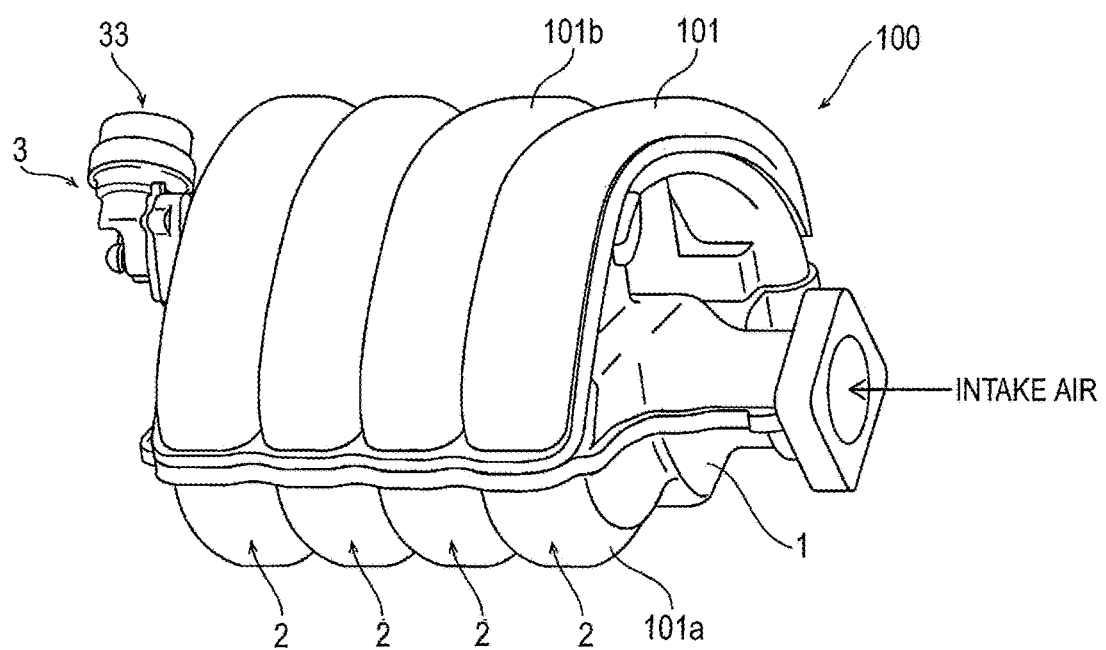
FIG. 1 is a perspective view illustrating the entire configuration of an air intake device in a first embodiment disclosed here.
Figure 2:
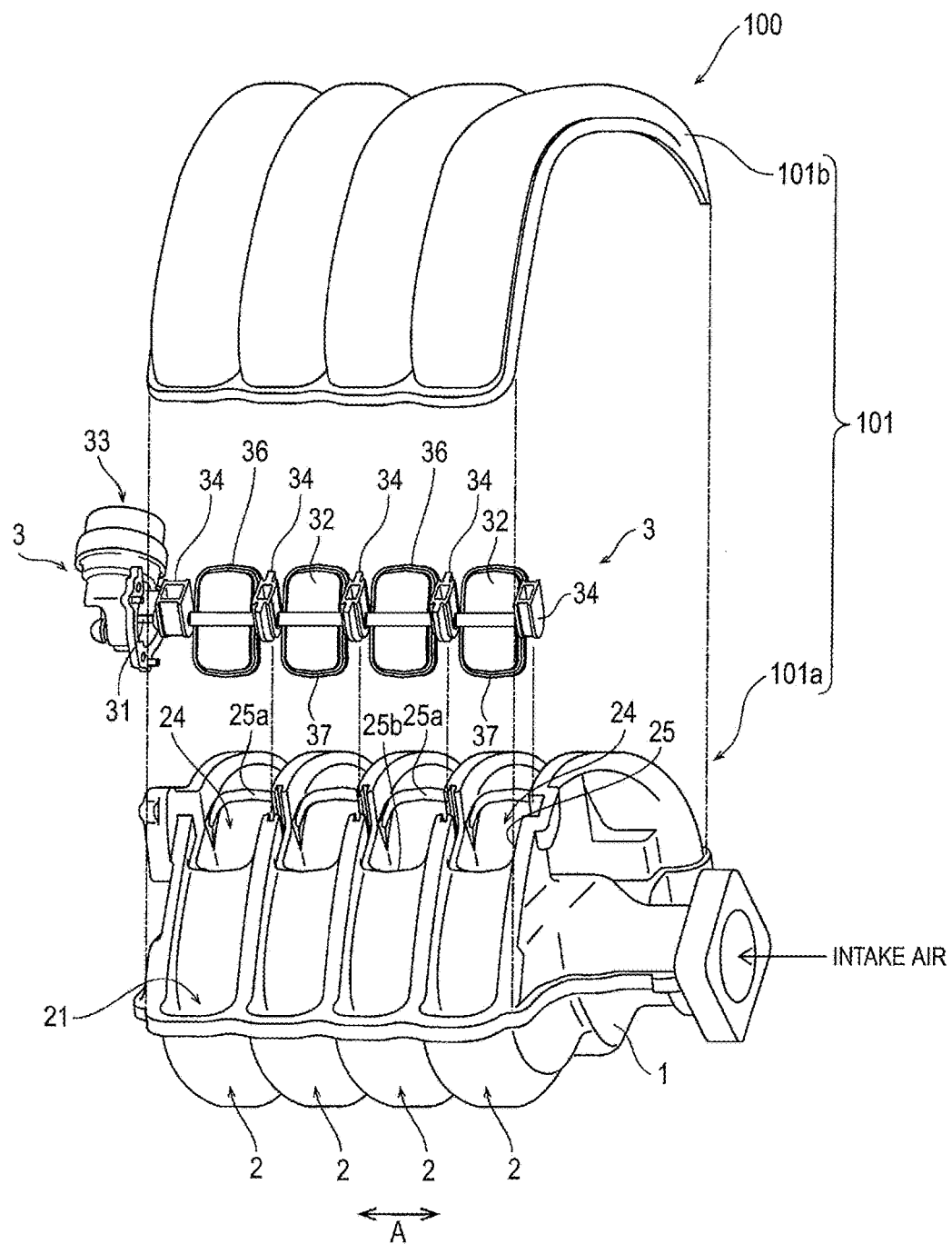
FIG. 2 is an exploded perspective view illustrating the entire configuration of the air intake device in the first embodiment disclosed here.
Figure 3:
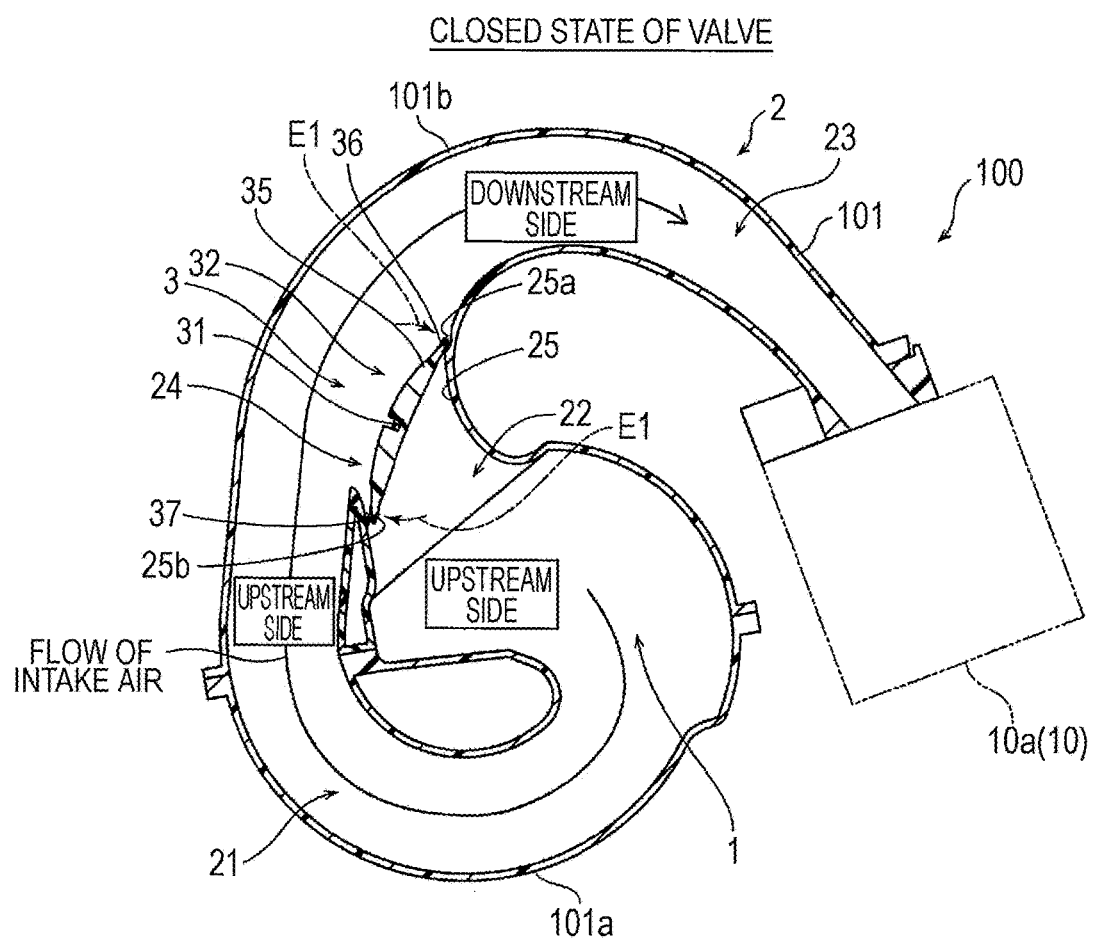
FIG. 3 is a sectional view illustrating a closed state of a valve of the air intake device in the first embodiment disclosed here.

As illustrated in FIGS. 1 to 4, an air intake device 100 in a first embodiment disclosed here is an air intake device that is provided in an in-line four-cylinder engine 10 (refer to FIGS. 3 and 4) for an automobile. The air intake device 100 includes a surge tank 1; four air intake ports 2 which diverge from the surge tank 1 and are disposed on the downstream side of the surge tank 1; and an air intake control valve assembly 3 including valves 32 which are respectively provided inside the four air intake ports 2. The air intake device 100 includes an air intake device body 101 including a body portion 101a made of resin, and a cover portion 101b made of resin. The body portion 101a and the cover portion 101b are integrally joined together via vibration welding in a state where the air intake control valve assembly 3 is mounted in the body portion 101a. As illustrated in FIGS. 3 and 4, the air intake device 100 is connected to a cylinder head 10a, and the four air intake ports 2 are respectively connected to the cylinders via the cylinder head 10a.

Air, which has reached the surge tank 1 via an air cleaner (not illustrated) and a throttle body (not illustrated), flows into the surge tank 1. Each of the four air intake ports 2 includes a first port portion 21; a second port portion 22; and an outlet port 23 that is positioned on the downstream side of the first port portion 21 and the second port portion 22, and is connected to a cylinder of the engine 10. The first port portion 21 extends from the surge tank 1 along a devious route, and is connected to the corresponding downstream outlet port 23. The second port portion 22 is provided such that the surge tank 1 is connected to the outlet port 23 via the air intake control valve assembly 3. An opening portion 24 is formed in a connection area in which the second port portion 22 is connected to the outlet port 23.

Structure of Air Intake Control Valve Assembly

As illustrated in FIG. 2, the air intake control valve assembly 3 includes a turning shaft 31 that is made of metal and is provided to pass through the four air intake ports 2; four valves 32 which are fixedly attached to the turning shaft 31, and respectively open and close the opening portions 24; and an actuator 33 that turns the turning shaft 31.

As illustrated in FIG. 3, in a state where the valves 32 are closed (in a closed state), long ports, each of which has a long intake air path, are formed of the first port portions 21 and the outlet ports 23. As illustrated in FIG. 4, in a state where the valves 32 are open (in an open state), short ports, each of which has a short intake air path, are formed of the second port portions 22 and the outlet ports 23. That is, the valves 32 of the air intake control valve assembly 3 are configured to be capable of switching between flow paths through which intake air flows. The valves 32 allow a more suitable amount of intake air to be supplied to the engine 10 by switching between the flow paths according to engine rotational speed, engine load, or the like.

Structure of Valve

As illustrated in FIG. 2, the four valves 32 are respectively provided in the four air intake ports 2. Since the common turning shaft 31 extending in a direction A is inserted through the four valves 32, and the four valves 32 are turned integrally with the turning shaft 31, the four valves 32 are opened and closed synchronously with each other. The valves 32 are turnably supported by a bearing member 34.

If the valves 32 are turned around the turning shaft 31 in a closing direction E1 of a turning direction E (refer to FIG. 7) as illustrated in FIG. 3, the valves 32 respectively come into contact with inner wall surfaces 25 of the air intake ports 2, and are switched to a closed state in which gaps between the inner wall surfaces 25 and the valves 32 are sealed. If the valves 32 are turned in an opening direction E2 of the turning direction E as illustrated in FIG. 4, the valves 32 are switched to an open state in which the valves 32 do not respectively come into contact with the inner wall surfaces 25. In the air intake device 100, a pressure difference may occur between the upstream side (surge tank 1 side) and the downstream side (engine 10 side) of the valves 32. Specifically, in a case where intake air flows through the air intake ports 2 toward the engine 10, a pressure difference may occur in such a way that the pressure of the upstream side is mainly higher than the pressure of the downstream side. In a case where pulsation occurs inside the air intake ports 2 in a closed state, a pressure difference may occur in such a way that the pressure of the downstream side is higher than the pressure of the upstream side. The flow of intake air occurs due to these pressure differences.

In a sectional view, each of the valves 32 in a closed state has a bow-like shape following along the shape of the air intake port 2 which extends while being curved. For this reason, air intake resistance caused by the valves 32 in the closed state is reduced, and as a result, it is possible to prevent an increase in pressure loss of intake air flowing through the air intake ports 2.

Figure 6:
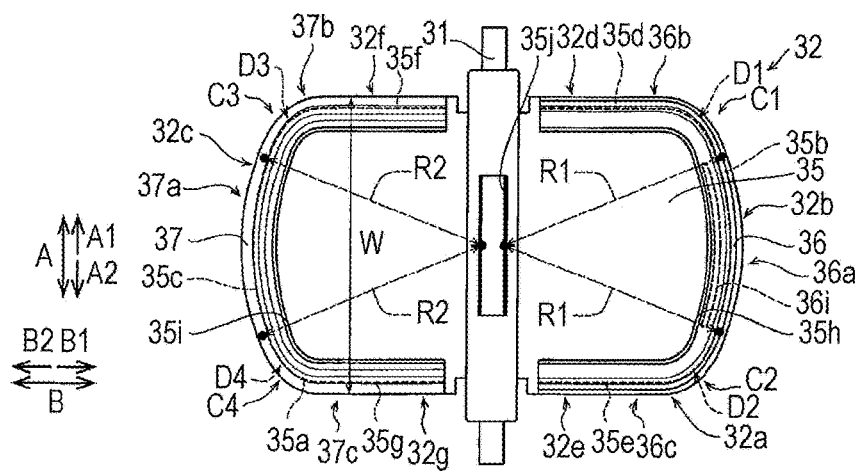
FIG. 6 is a top view illustrating the valve of the air intake device in the first embodiment disclosed here.

As illustrated in FIGS. 5 and 6, in a top view, the valve 32 has a substantially rectangular shape. As illustrated in FIG. 6, each of four corners C1 to C4 (refer to FIG. 6) of the valve 32 has a rounded shape. The valve 32 having a substantially rectangular shape has a width W in the direction A of extension of the turning shaft 31.

In the first embodiment, a side end portion 32a (curved side end portion 32b) extends such that the corners C1 and C2 on a B1 side are connected to each other along the direction A, in which the turning shaft 31 extends, via the side end portion 32a. The side end portion 32a is curved at a radius of curvature R1 separated from the turning shaft 31 and moving outward toward a direction B1. The curved side end portion 32b extends from a corner C1 side of the valve 32, which is positioned on an A1 side and the B1 side, to a corner C2 side of the valve 32 which is positioned on an A2 side and the B1 side. The corners C1 and C2 are respectively examples of "one end portion" and "the other end portion" described in the appended claims.

Similarly, the side end portion 32a (curved side end portion 32c) extends such that the corners C3 and C4 on a B2 side are connected to each other along the direction A, in which the turning shaft 31 extends, via the side end portion 32a. The side end portion 32a is curved at a radius of curvature R2 separated from the turning shaft 31 and moving outward toward a direction B2. The curved side end portion 32c extends from a corner C3 side of the valve 32, which is positioned on the A1 side and the B2 side, to a corner C4 side of the valve 32 which is positioned on the A2 side and the B2 side. The curved side end portions 32b and 32c are formed such that the curved side end portions 32b and 32c are curved continuously from the rounded corners C1 to C4. The corners C3 and C4 are respectively examples of "one end portion" and "the other end portion" described in the appended claims.

In contrast, the side end portions 32a (side end portions 32d, 32e, 32f, and 32g) on both sides of the valve 32 in the direction A extend substantially straight along a direction B perpendicular to the direction A.

As illustrated in FIGS. 5 and 6, each of the valves 32 includes a valve body 35 that is formed into a substantially rectangular plate shape; a seal portion 36 that is provided in a body side end portion 35a (refer to FIG. 6) of the valve body 35 which is positioned on the B1 side and is close to the engine 10; a seal portion 37 that is provided in the body side end portion 35a (refer to FIG. 6) of the valve body 35 which is positioned on the B2 side and is spaced away from the engine 10.

As illustrated in FIG. 6, in a top view, the valve body 35 has the same shape as that of the valve 32. Specifically, the valve body 35 has a substantially rectangular shape in which four corners D1 to D4 of the valve body 35 are rounded.

The body side end portion 35a (curved body side end portion 35b) extends such that the corners D1 and D2 on the B1 side are connected to each other along the direction A, in which the turning shaft 31 extends, via the body side end portion 35a. The body side end portion 35a is curved at a predetermined radius of curvature separated from the turning shaft 31 and moving outward toward the direction B1. The curved body side end portion 35b extends from the corner D1 of the valve body 35, which is positioned on the A1 side and the B1 side, to the corner D2 of the valve body 35 which is positioned on the A2 side and the B1 side. The corners D1 and D2 are positioned at positions which respectively correspond to the corners C1 and C2 (refer to FIG. 6) of the valve 32.

Similarly, the body side end portion 35a (curved body side end portion 35c) extends such that the corners D3 and D4 on the B2 side are connected to each other along the direction A, in which the turning shaft 31 extends, via the body side end portion 35a. The body side end portion 35a is curved at a predetermined radius of curvature separated from the turning shaft 31 and moving outward toward the direction B2. The curved body side end portion 35c extends from the corner D3 of the valve body 35, which is positioned on the A1 side and the B2 side, to the corner D4 of the valve body 35 which is positioned on the A2 side and the B2 side. The curved body side end portions 35b and 35c are formed such that the curved body side end portions 35b and 35c are curved continuously from the rounded corners D1 to D4. The corners D3 and D4 are positioned at positions which respectively correspond to the corners C3 and C4 (refer to FIG. 6) of the valve 32.

In contrast, the body side end portions 35a (side end portions 35d, 35e, 35f, and 35g) on both sides of the valve body 35 in the direction A extend substantially straight along the direction B perpendicular to the direction A.

Contact portions 35h and 35i are integrally formed in the valve body 35, and are respectively in contact with the seal portions 36 and 37. A turning shaft insertion portion 35j, through which the turning shaft 31 passes, is formed at substantially the center of the valve body 35 in the direction B.

As illustrated in FIGS. 5 and 7 to 9, the seal portions 36 and 37 seal a gap between the inner wall surface 25 and the valve 32 by being in contact with the inner wall surface 25 of the air intake port 2 when the valve 32 is closed. The seal portions 36 and 37 are made of flexible rubber or the like which can be elastically deformed. The seal portions 36 and 37 are respectively provided in the body side end portion 35a (the curved body side end portion 35b and the side end portions 35d and 35e) of the valve body 35 on the B1 side and the body side end portion 35a (the curved body side end portion 35c and the side end portions 35f and 35g) on the B2 side via insert molding.

In the first embodiment, as illustrated in FIG. 6, each of the seal portions 36 and 37 is formed to have a substantially predetermined width in a top view, and is formed into a shape corresponding to the valve body 35. That is, the seal portion 36 extends along the direction A so as to correspond to the valve body 35. The seal portion 36 includes a seal portion curved portion 36a that is curved while being separated from the valve body 35 (the turning shaft 31) and moving outward toward the direction B1, and seal portion straight portions 36b and 36c which extend substantially straight along the direction B. The curved side end portion 32b (refer to FIG. 6), which is curved outward at the radius of curvature R1, is formed in the valve 32 by disposing the seal portion curved portion 36a of the seal portion 36 in the curved body side end portion 35b which is curved outward.

Similarly, as illustrated in FIG. 6, the seal portion 37 extends along the direction A so as to correspond to the valve body 35. The seal portion 37 includes a seal portion curved portion 37a that is curved while being separated from the valve body 35 (the turning shaft 31) and moving outward toward the direction B2, and seal portion straight portions 37b and 37c which extend substantially straight along the direction B. The curved side end portion 32c (refer to FIG. 6), which is curved outward at the radius of curvature R2, is formed in the valve 32 by disposing the seal portion curved portion 37a of the seal portion 37 in the curved body side end portion 35c which is curved outward.

Figure 10:
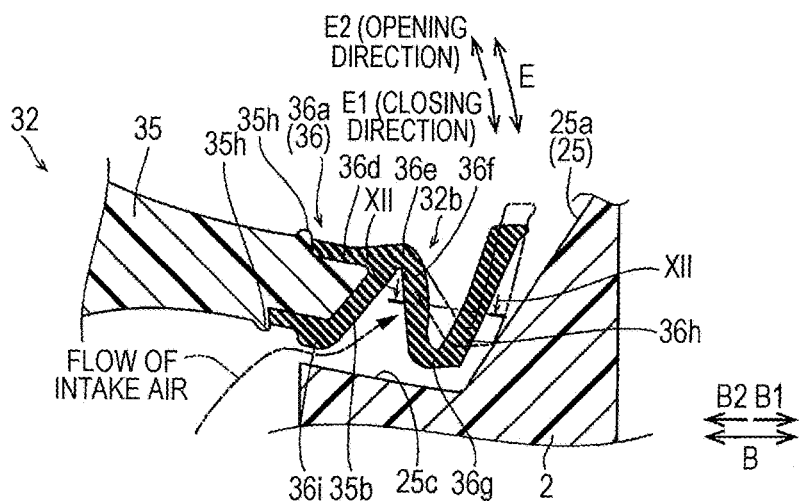
FIG. 10 is an enlarged sectional view illustrating one side of the valve and the air intake port of the air intake device in the first embodiment disclosed here.

As illustrated in FIG. 10, the seal portion 36 includes a fixing portion 36d that is fixed to the B1 side of the valve body 35; a deformable portion 36f that extends from a connection portion 36e of the fixing portion 36d toward the closing direction E1 while being separated from the valve body 35; and a contact portion 36h that extends from a connection portion 36g (positioned opposite to the valve body 35) of the deformable portion 36f toward the opening direction E2. The fixing portion 36d, the deformable portion 36f, and the contact portion 36h are formed over the entirety of a side end portion of the seal portion 36.

Figure 11:
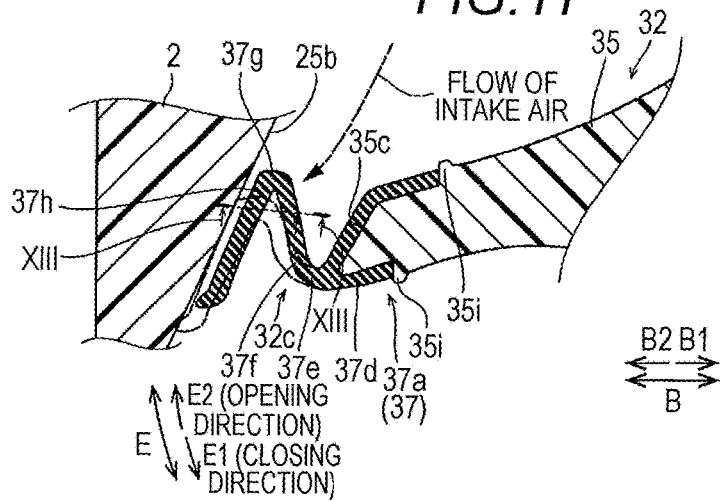
FIG. 11 is an enlarged sectional view illustrating the other side of the valve and the air intake port of the air intake device in the first embodiment disclosed here.

Similarly, as illustrated in FIG. 11, the seal portion 37 includes a fixing portion 37d that is fixed to the B2 side of the valve body 35; a deformable portion 37f that extends from a connection portion 37e of the fixing portion 37d toward the closing direction E1 while being separated from the valve body 35; and a contact portion 37h that extends from a connection portion 37g (positioned opposite to the valve body 35) of the deformable portion 37f toward the opening direction E2. The fixing portion 37d, the deformable portion 37f, and the contact portion 37h are formed over the entirety of a side end portion of the seal portion 37.

The deformable portion 36f and the contact portion 36h of the seal portion 36 and the deformable portion 37f and the contact portion 37h of the seal portion 37 are formed to radially protrude outward from the side end portions 32a of the valve 32 (separated from the valve body 35).

Figure 7:
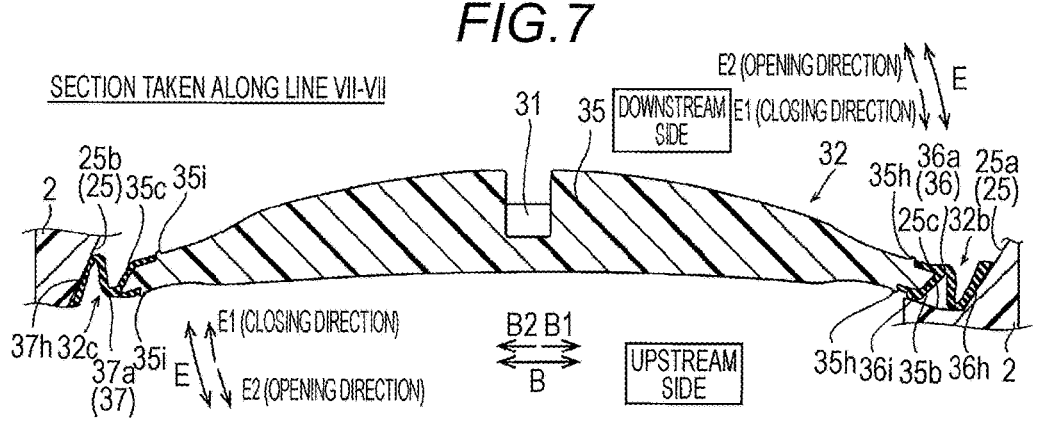
FIG. 7 is a sectional view of the valve and an air intake port which is taken along line VII-VII in FIG. 5.
Figure 8:
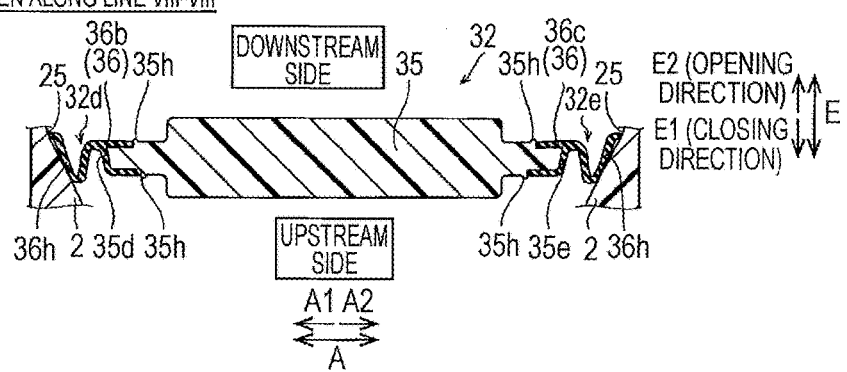
FIG. 8 is a sectional view of the valve which is taken along line VIII-VIII in FIG. 5.
Figure 9:
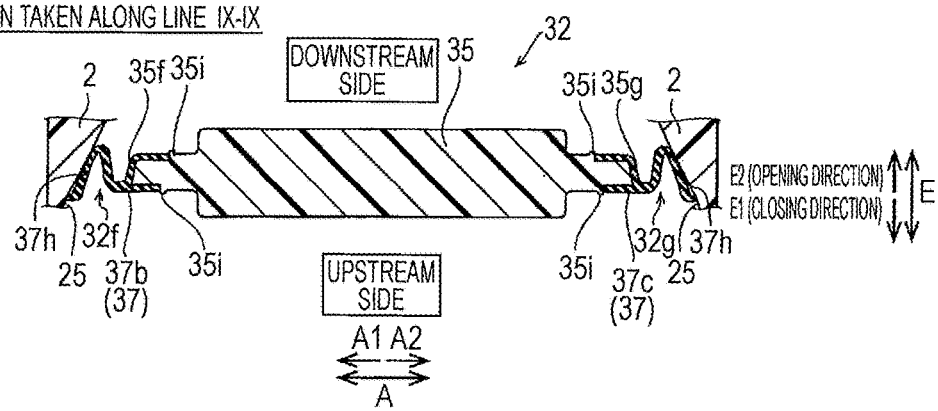
FIG. 9 is a sectional view of the valve which is taken along line IX-IX in FIG. 5.

As illustrated in FIGS. 7 to 9, the contact portions 36h and 37h seal a gap between the valve 32 and the air intake port 2 by being in contact with the inner wall surface 25 of the air intake port 2 when the valve 32 is closed. As illustrated in FIG. 10, when the valve 32 is closed, turning force of the valve 32 is applied to the seal portion 36, and thus, the deformable portion 36f and the contact portion 36h are bent around the connection portion 36g in such a way as to approach each other. For this reason, the contact portion 36h is in contact with the inner wall surface 25 of the air intake port 2 in a state where the contact portion 36h is elastically deformed, and biasing force caused by elastic deformation of the deformable portion 36f and the contact portion 36h is applied to and presses the inner wall surface 25. Similarly, as illustrated in FIG. 11, the deformable portion 37f and the contact portion 37h of the seal portion 37 are also bent around the connection portion 37g in such a way as to approach each other. For this reason, the contact portion 37h is in contact with the inner wall surface 25 of the air intake port 2 in a state where the contact portion 37h is elastically deformed, and biasing force generated by elastic deformation of the deformable portion 37f and the contact portion 37h is applied to and presses the inner wall surface 25. As a result, the contact portions 36h and 37h are in close contact with the inner wall surface 25 of the air intake port 2.

As illustrated in FIG. 7, a restriction portion 36i is formed in the seal portion 36 in such a way as to protrude from the fixing portion 36d toward the closing direction E1. The restriction portion 36i restricts further turning of the valve 32 from a closed state of the valve 32 toward the closing direction E1 by coming into contact with the inner wall surface 25 of the air intake port 2 when the valve 32 is closed. As a result, the valve body 35 is prevented from coming into contact with the inner wall surface 25. In contrast, a restriction portion is not provided in the seal portion 37.

Figure 12:
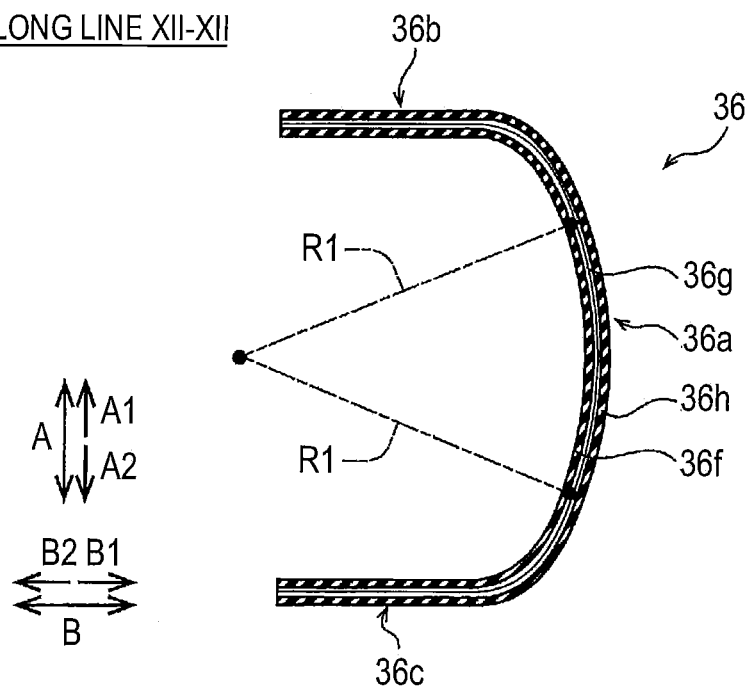
FIG. 12 is a sectional view illustrating a deformable portion and a contact portion of a seal portion of the one side which is taken along line XII-XII in FIG. 10.
Figure 13:
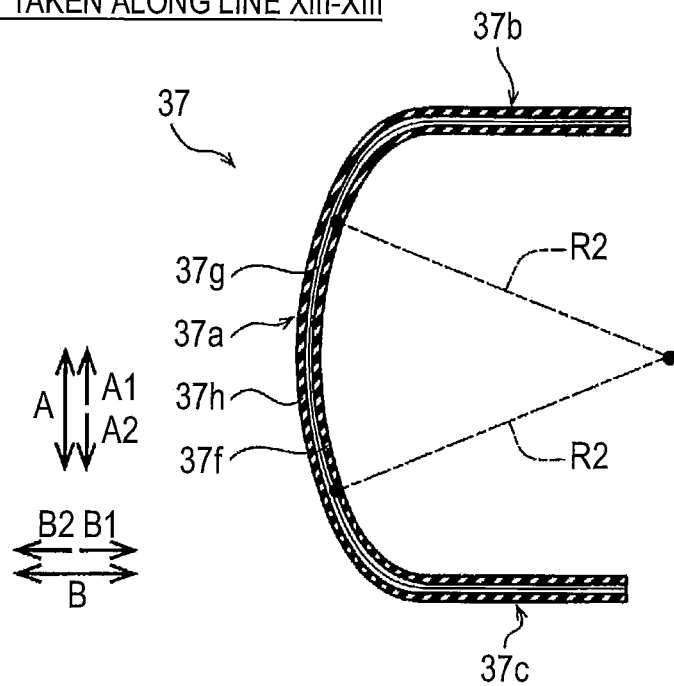
FIG. 13 is a sectional view illustrating a deformable portion and a contact portion of a seal portion of the other side which is taken along line XIII-XIII in FIG. 11.

As illustrated in FIG. 12, the deformable portion 36f of the seal portion curved portion 36a, which is curved outward toward the B1 side, is curved at the radius of curvature R1 moving outward toward the B1 side. Similarly, as illustrated in FIG. 13, the deformable portion 37f of the seal portion curved portion 37a, which is curved outward toward the B2 side, is also curved at the radius of curvature R2 moving outward toward the B2 side.

As illustrated in FIG. 10, when intake air flows through the flow path of the air intake port 2 from the upstream side to the downstream side, force caused by the pressure of flowing intake air is applied to the seal portion curved portion 36a of the seal portion 36 extending along the turning shaft 31 in the direction A such that the deformable portion 36f is deformed around the connection portion 36e between the fixing portion 36d and the deformable portion 36f toward the opening direction E2. This force is applied immediately before the valve 32 is closed. As a result, the seal portion 36 is likely to be deformed as illustrated by an alternate one long and two short dashes line in FIG. 10. However, since the deformable portion 36f of the seal portion curved portion 36a is curved outward as illustrated in FIG. 12, the deformable portion 36f has a high geometrical moment of inertia. As a result, deformation of the deformable portion 36f of the seal portion curved portion 36a is prevented.

Similarly, as illustrated in FIG. 11, when intake air flows through the flow path of the air intake port 2 from the downstream side to the upstream side due to pulsation occurring inside the air intake port 2, force caused by pulsation pressure is applied to the seal portion curved portion 37a of the seal portion 37 extending along the turning shaft 31 in the direction A such that the deformable portion 37f is deformed around the connection portion 37e between the fixing portion 37d and the deformable portion 37f toward the opening direction E2. This force is applied immediately before the valve 32 is closed. As a result, the seal portion 37 is likely to be deformed as illustrated by an alternate one long and two short dashes line in FIG. 11. However, since the deformable portion 37f of the seal portion curved portion 37a is curved outward as illustrated in FIG. 13, the deformable portion 37f has a high geometrical moment of inertia. As a result, deformation of the deformable portion 37f of the seal portion curved portion 37a is prevented.

In order to sufficiently increase the geometrical moment of inertia of the deformable portions 36f and 37f, a ratio (the radius of curvature R1/the width W) between the radius of curvature R1 of the curved side end portion 32b and the width W (refer to FIG. 6) of the valve 32 in the direction A of extension of the turning shaft 31, and a ratio (the radius of curvature R2/the width W) between the radius of curvature R2 of the curved side end portion 32c and the width W of the valve 32 in the direction A are preferably set to approximately two or less, and are more preferably set to approximately one or less. For example, in a case where the width W of the valve 32 in the direction A is approximately 50 mm, the radius of curvature R1 and the radius of curvature R2 are preferably set to approximately 100 mm or less, and are more preferably set to approximately 50 mm or less.

As illustrated in FIG. 5, the inner wall surface 25 of the air intake port 2 is configured such that the seal portions 36 and 37 of the valve 32 can be in contact with the inner wall surface 25. That is, an inner wall surface (curved inner wall surface 25a) of a portion of the air intake port 2, which corresponds to the curved side end portion 32b which is positioned on the B1 side and is curved outward, is curved inward, that is, is recessed toward the B1 side so as to correspond to the curved side end portion 32b. Similarly, an inner wall surface (curved inner wall surface 25b) of a portion of the air intake port 2, which corresponds to the curved side end portion 32c which is positioned on the B2 side and is curved outward, is curved inward, that is, is recessed toward the B2 side so as to correspond to the curved side end portion 32c. As illustrated in FIG. 7, a flat portion 25c is formed in the inner wall surface 25 of the air intake port 2, and when the valve 32 is closed, the restriction portion 36i of the seal portion 36 is in contact with the flat portion 25c.

Simulation

A simulation, in which a relationship between the ratio of the radius of curvature R to the width W and the geometrical moment of inertia of the valve 32 in the first embodiment is obtained, will be described.

In the simulation, in an example, the geometrical moment of inertia was obtained in a case where the ratio of the radius of curvature R to the width W of the valve 32 with the curved side end portions 32b and 32c in the first embodiment was changed. In a comparative example, the geometrical moment of inertia (that is, the radius of curvature is infinite) of a valve without curved side end portions was obtained. Simulation results are illustrated by a graph in FIG. 14. The value of the geometrical moment of inertia in the comparative example illustrated in FIG. 14 has no connection with the value of the ratio of the radius of curvature R to the width W in the graph.

Figure 14:
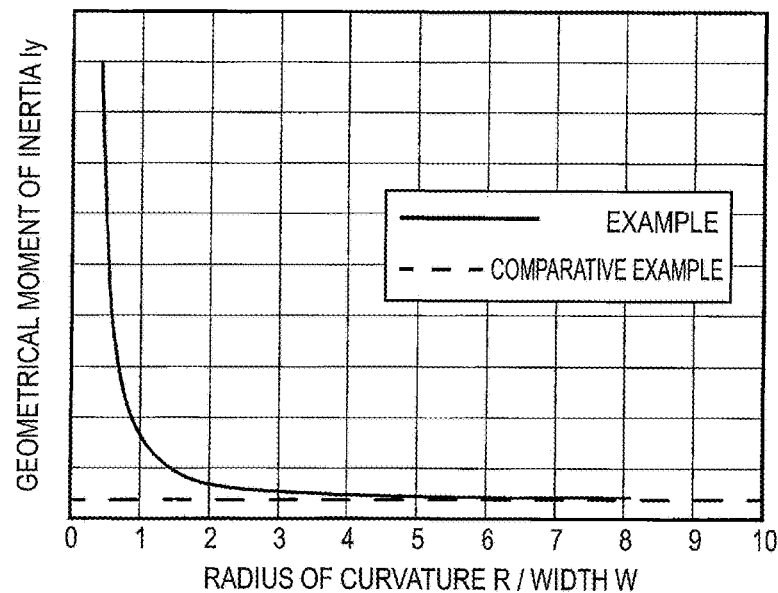
FIG. 14 is a graph illustrating simulation results.

It was confirmed from the simulation results illustrated in FIG. 14 that the geometrical moment of inertia (illustrated by a solid line) in the example was higher than that (illustrated by a dotted line) in the comparative example. In addition, it was confirmed that when the ratio of the radius of curvature R to the width W was four or less, the geometrical moment of inertia increased exponentially. It was confirmed that particularly, in a case where the ratio of the radius of curvature R to the width W was two or less, the geometrical moment of inertia was approximately two times or more than that in the comparative example, and in a case where the ratio of the radius of curvature R to the width W was one or less, the geometrical moment of inertia was approximately four times or more than that in the comparative example. As a result, it was confirmed that in a case where the ratio of the radius of curvature R1 to the width W and the ratio of the radius of curvature R2 to the width W were set to two or less, the deformable portion 36f of the seal portion 36 in the curved side end portion 32b and the deformable portion 37f of the seal portion 37 in the curved side end portion 32c would be unlikely to be considerably deformed by external force, and in a case where the ratio of the radius of curvature R1 to the width W and the ratio of the radius of curvature R2 to the width W were set to one or less, the deformable portion 36f of the curved side end portion 32b and the deformable portion 37f of the curved side end portion 32c would be unlikely to be effectively deformed by external force.

Effects of First Embodiment

In the first embodiment, it is possible to obtain the following effects.

In the first embodiment, the side end portion 32a of the valve 32 is provided with the curved side end portion 32b that extends from the corner C1 side to the corner C2 side along the direction A of extension of the turning shaft 31 while being curved, and with the curved side end portion 32c that extends from the corner C3 side to the corner C4 side along the direction A of extension of the turning shaft 31 while being curved. For this reason, it is possible to increase the geometrical moment of inertia of each of the seal portion 36 in the curved side end portion 32b which is curved, and the seal portion 37 in the curved side end portion 32c which is curved compared to that in a case where the side end portions 32a of the valve 32 are formed straight. Accordingly, it is possible to improve robustness by preventing deformation of the seal portion 36 in the curved side end portion 32b and deformation of the seal portion 37 in the curved side end portion 32c, which are caused by external force induced by the flow of intake air (fluid) flowing through the air intake port 2. As a result, it is possible to prevent the deformed seal portions 36 and 37 from causing insufficient sealing between the air intake port 2 and the valve 32.

In the first embodiment, the curved side end portion 32b is provided in a portion of the side end portion 32a of the valve 32, which extends from the corner C1 side to the corner C2 side along the direction A of extension of the turning shaft 31. The curved side end portion 32c is provided in a portion of the side end portion 32a of the valve 32, which extends from the corner C3 side to the corner C4 side along the direction A. As a result, it is possible to prevent deformation of a portion (which is positioned along the direction A of extension of the turning shaft 31, and to which force caused by the flow of the fluid is likely to be applied) of the seal portion 36 in the curved side end portion 32b, and to prevent deformation of a portion (which is positioned along the direction A of extension of the turning shaft 31, and to which force caused by the flow of the fluid is likely to be applied) of the seal portion 37 in the curved side end portion 32c.

In the first embodiment, since the seal portions 36 and 37 can be elastically deformed, the seal portions 36 and 37 disposed in the side end portions 32a of the valve 32 are capable of coming into close contact with the inner wall surface 25 of the air intake port 2. As a result, in the air intake device 100, it is possible to sufficiently seal the gap between the air intake port 2 and the valve 32.

In the first embodiment, the curved side end portions 32b and 32c are respectively curved while being separated from the turning shaft 31 and moving outward toward the direction B1 and the direction B2. For this reason, the curved inner wall surfaces 25a and 25b of the air intake port 2 may be formed inward to respectively correspond to the curved side end portions 32b and 32c. Accordingly, it is possible to prevent a decrease in the diameter of the flow path (sectional area of the flow path) of the air intake port 2, unlike a case in which each curved side end portion is curved inward and the inner wall surface of the air intake port is formed outward to correspond thereto. As a result, it is possible to prevent an increase in the pressure loss of the fluid (intake air) flowing through the air intake port 2.

In the first embodiment, the ratio of the radius of curvature R1 to the width W and the ratio of the radius of curvature R2 to the width W are set to approximately two or less. In this configuration, it is possible to reliably increase the geometrical moment of inertia of the seal portion 36 in the curved side end portion 32b, and the geometrical moment of inertia of the seal portion 37 in the curved side end portion 32c. As a result, it is possible to effectively prevent external force from causing deformation of the seal portion 36 in the curved side end portion 32b and deformation of the seal portion 37 in the curved side end portion 32c.

In the first embodiment, the seal portion 36 is disposed in a curved manner in the curved body side end portion 35b of the valve body 35 which extends along the direction A of extension of the turning shaft 31 while being curved. The seal portion 37 is disposed in a curved manner in the curved body side end portion 35c of the valve body 35 which extends along the direction A while being curved. As a result, it is possible to reduce complexity of the shapes of the seal portions 36 and 37, and to easily form the curved side end portions 32b and 32c in the side end portions 32a of the valve 32.

In the first embodiment, the curved side end portions 32b and 32c are respectively formed in a pair of the side end portions 32a of the rectangular valve 32 which extend along the direction A of extension of the turning shaft 31. For this reason, it is possible to respectively provide the curved side end portions 32b and 32c having a high geometrical moment of inertia in the pair of side end portions 32a of the rectangular valve 32 which are most likely to receive pressure from the fluid (intake air) and extend along the direction A of extension of the turning shaft 31. As a result, it is possible to prevent external force from causing deformation of the seal portion 36 in the curved side end portion 32b which is likely to receive pressure, and deformation of the seal portion 37 in the curved side end portion 32c which is likely to receive pressure.

In the first embodiment, both the deformable portion 36f of the seal portion 36 and the deformable portion 37f of the seal portion 37 are formed to radially protrude outward from the side end portions 32a of the valve 32. Even if the deformable portions 36f and 37f, which are likely to be deformed because the deformable portion 36f and the deformable portion 37f extend in such a way as to radially protrude outward from the side end portions 32a of the valve 32, are provided, since the curved side end portions 32b and 32c which are curved are provided, it is possible to increase the geometrical moment of inertia of the deformable portion 36f in the curved side end portion 32b, and the geometrical moment of inertia of the deformable portion 37f in the curved side end portion 32c. As a result, it is possible to prevent external force from causing deformation of the deformable portion 36f in the curved side end portion 32b, and deformation of the deformable portion 37f in the curved side end portion 32c.

In the first embodiment, the ratio of the radius of curvature R1 to the width W and the ratio of the radius of curvature R2 to the width W are set to approximately one or less. In the configuration, it is possible to reliably increase the geometrical moment of inertia of the seal portion 36 in the curved side end portion 32b, and the geometrical moment of inertia of the seal portion 37 in the curved side end portion 32c. As a result, it is possible to more effectively prevent external force from causing deformation of the seal portion 36 of the curved side end portion 32b and deformation of the seal portion 37 of the curved side end portion 32c.

Second Embodiment

Hereinafter, the configuration of a valve 132 in a second embodiment will be described with reference to FIGS. 15 to 18. In the valve 132 of the second embodiment, the shapes of seal portions 136 and 137 are different from those of the seal portions 36 and 37 in the first embodiment. The same reference signs will be assigned to the same configuration elements as those in the first embodiment, and description thereof will be omitted.

Structure of Valve

Figure 15:
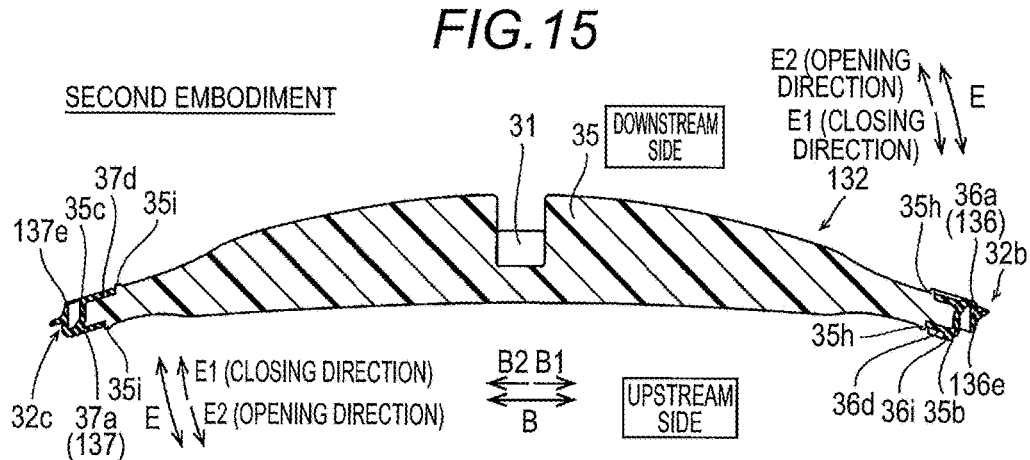
FIG. 15 is a sectional view illustrating a valve of the air intake device in a second embodiment disclosed here.

As illustrated in FIG. 15, the valve 132 in the second embodiment includes the valve body 35; the seal portion 136 that is provided in the body side end portion 35a of the valve body 35 which is positioned on the B1 side; and the seal portion 137 that is provided in the body side end portion 35a of the valve body 35 which is positioned on the B2 side.

The seal portions 136 and 137 seal a gap between the inner wall surface 25 and the valve 132 by being in contact with the inner wall surface 25 (refer to FIGS. 17 and 18) of the air intake port 2 when the valve 132 is closed. The seal portions 136 and 137 are made of flexible rubber or the like which can be elastically deformed.

In the second embodiment, a deformable portion 136e, which can be elastically deformed, is provided in the seal portion curved portion 36a of the seal portion 136, and extends from the fixing portion 36d while being separated from the valve body 35. Similarly, a deformable portion 137e, which can be elastically deformed, is provided in the seal portion curved portion 37a of the seal portion 137, and extends from the fixing portion 37d while being separated from the valve body 35.

Figure 16:
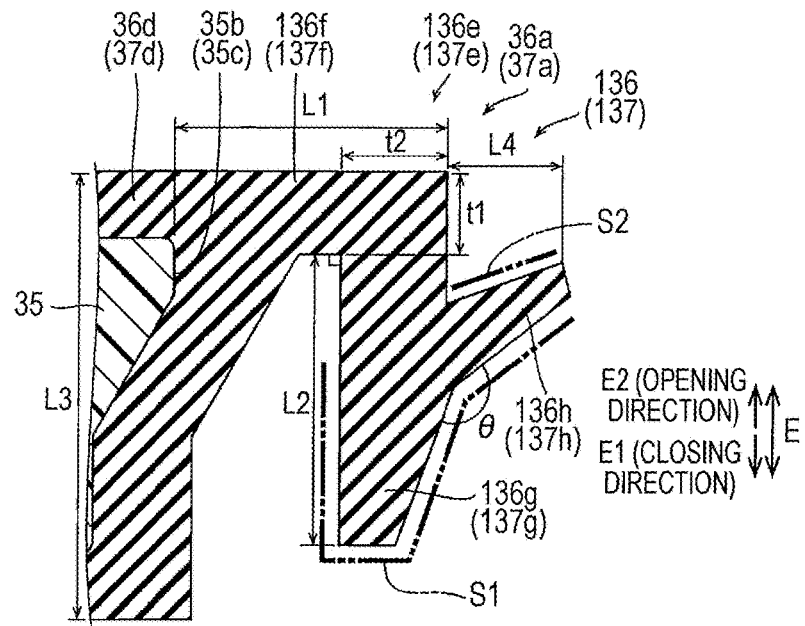
FIG. 16 is an enlarged sectional view illustrating a portion of a seal portion of the valve of the air intake device in the second embodiment disclosed here.

As illustrated in FIG. 16, the deformable portion 136e includes a first deformable portion 136f; a second deformable portion 136g; and a third deformable portion 136h. The first deformable portion 136f extends from the fixing portion 36d while being separated from the valve body 35. The second deformable portion 136g extends from the deformable portion 136e toward one side (closing direction and an E1 side) in a turning direction (direction E). The third deformable portion 136h extends from the second deformable portion 136g toward the other side (opening direction and an E2 side) in the direction E while being separated from the valve body 35. As a result, the deformable portion 136e is bent in two stages such that the second deformable portion 136g and the third deformable portion 136h are connected to each other to form a bent shape. When the valve 132 is closed, the third deformable portion 136h is in contact with the inner wall surface 25 of the air intake port 2 in a state where the deformable portion 136e is deformed.

Similarly, the deformable portion 137e includes a first deformable portion 137f; a second deformable portion 137g; and a third deformable portion 137h. The first deformable portion 137f extends from the fixing portion 37d while being separated from the valve body 35. The second deformable portion 137g extends from the deformable portion 137e toward the one side (closing direction and the E1 side) in the turning direction (the direction E). The third deformable portion 137h extends from the second deformable portion 137g toward the other side (opening direction and the E2 side) in the direction E while being separated from the valve body 35. As a result, the deformable portion 137e is bent in two stages such that the second deformable portion 137g and the third deformable portion 137h are connected to each other to form a bent shape. When the valve 132 is closed, the third deformable portion 137h is in contact with the inner wall surface 25 of the air intake port 2 in a state where the deformable portion 137e is deformed. Since the configuration of the deformable portion 137e of the seal portion 137 is the same as that of the deformable portion 136e of the seal portion 136 as illustrated in FIGS. 15 and 16, only the deformable portion 136e will be described in detail, and detailed description of the deformable portion 137e will be omitted.

As illustrated in FIG. 16, the first deformable portion 136f has a length L1 away from the valve body 35, and has a thickness t1 in the direction E. The second deformable portion 136g has a length L2 in the direction E. A first deformable portion 136f side of the second deformable portion 136g has a thickness t2 away from the valve body 35.

In the second embodiment, the sum of the length L2 and the thickness t1 (=L2+t1) is less than a length L3 of the valve 132 at the location of the fixing portion 36d. For this reason, in the deformable portion 136e, an area S1 of E1 side surfaces of the second deformable portion 136g and the third deformable portion 136h, which are spaced away from the fixing portion 36d, can be reduced. The sum of the length L2 and the thickness t1 is preferably less than approximately two third of the length L3. The sum of the length L2 and the thickness t1 is preferably approximately three times or more to approximately seven times or less than the thickness t2.

The first deformable portion 136f and the second deformable portion 136g are formed to be perpendicular to each other. As a result, it is possible to easily form the second deformable portion 136g and the third deformable portion 136h in the seal portion 136. In addition, it is possible to prevent the third deformable portion 136h from coming into contact with the inner wall surface 25 of the air intake port 2 before the valve 132 is closed, compared to a case where an angle between the first deformable portion 136f and the second deformable portion 136g is an obtuse angle. As a result, it is possible to prevent a case in which the deformable portion 136e is rolled up such that a side surface (positioned to face the valve body 35) of the second deformable portion 136g comes into contact with the inner wall surface 25 while the third deformable portion 136h does not come into contact with the inner wall surface 25. As a result, the seal portion 136 is capable of coming into sufficient contact with the inner wall surface 25 of the air intake port 2.

The length L1 away from the valve body 35 is preferably approximately two times or more to approximately four times or less than the thickness t2. For this reason, the third deformable portion 136h is capable of sufficiently approaching the inner wall surface 25 of the air intake port 2. As a result, the third deformable portion 136h is capable of more reliably coming into contact with the inner wall surface 25 of the air intake port 2.

The second deformable portion 136g is tapered such that the thickness of an E1 side portion of the second deformable portion 136g is decreased. For this reason, during closing of the valve 132, an E1 side end portion of the second deformable portion 136g can be prevented from coming into contact with the inner wall surface 25 of the air intake port 2 prior to the valve 132 is closed. As a result, it is possible to prevent a case in which the seal portion 136 is rolled up from the E1 side end portion of the second deformable portion 136g such that the side surface (positioned to face the valve body 35) of the second deformable portion 136g comes into contact with the inner wall surface 25 while the third deformable portion 136h does not come into contact with the inner wall surface 25.

In addition, an angle θ between the E1 side surface of the second deformable portion 136g and the E1 side surface of the third deformable portion 136h is set to an obtuse angle (to be less than 180 degrees). As a result, it is possible to prevent dimension variations or the like from causing insufficient contact between the third deformable portion 136h and the inner wall surface 25 of the air intake port 2 when the valve 132 is closed.

A protrusion length L4 of the third deformable portion 136h, which is a dimension from the second deformable portion 136g in a direction in which the third deformable portion 136h is separated from the valve body 35, is set to be considerably less than the length L1. As a result, it is possible to reduce an area S2 of an E2 side surface of the third deformable portion 136h.

Contact of Valve

Figure 17:
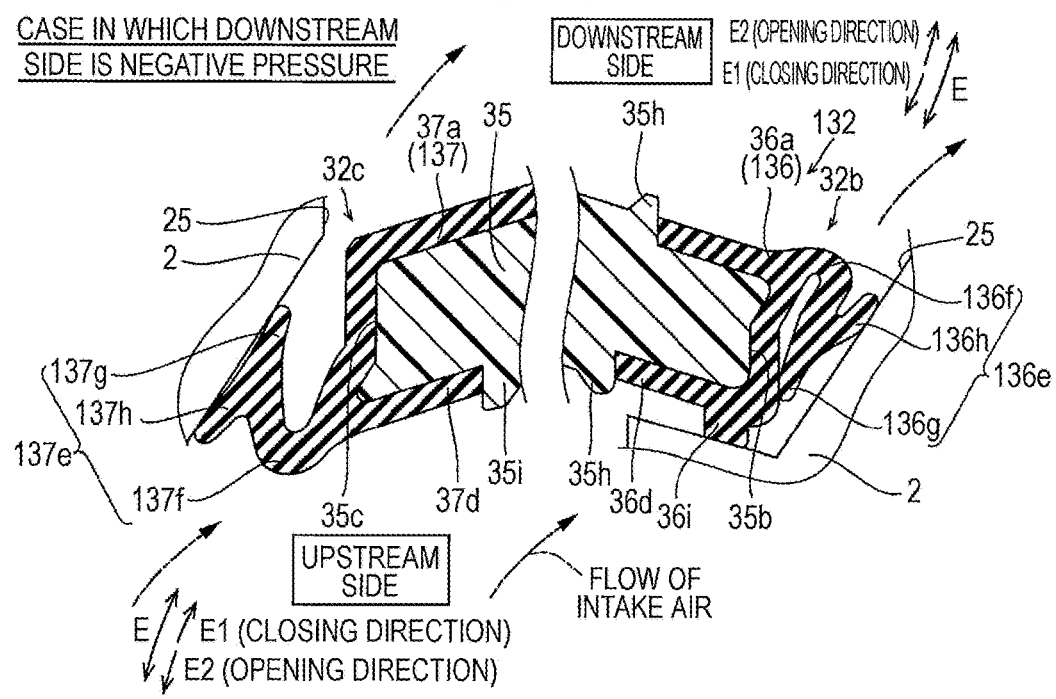
FIG. 17 is an enlarged sectional view illustrating the valve and an air intake port of the air intake device in the second embodiment disclosed here.
Figure 18:
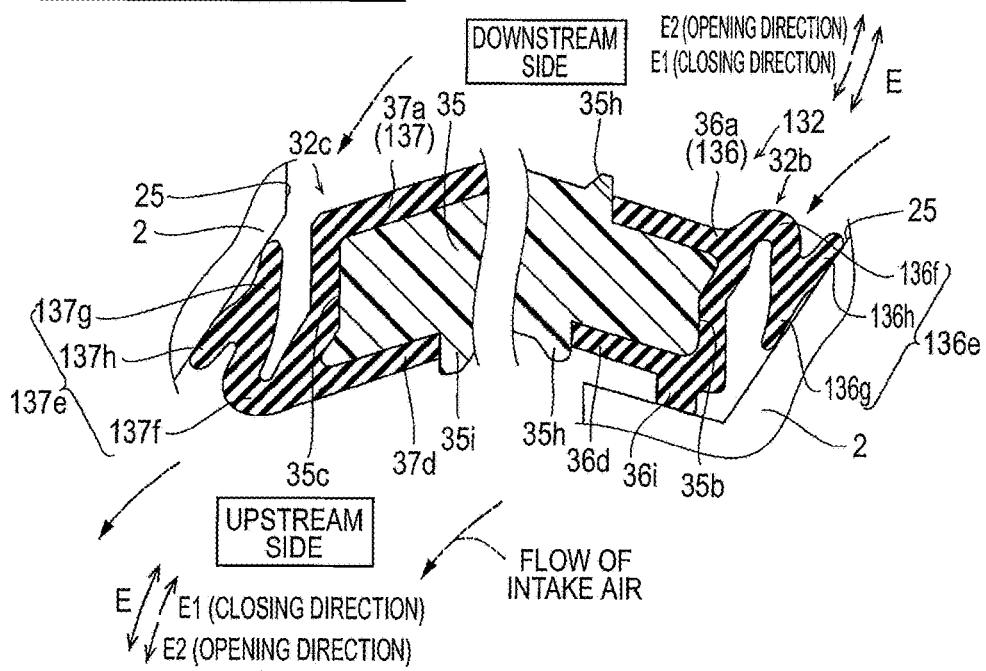
FIG. 18 is an enlarged sectional view illustrating the valve and the air intake port of the air intake device in the second embodiment disclosed here.

As illustrated in FIGS. 17 and 18, during closing of the valve 132, due to differential pressure between the upstream side and the downstream side of the valve 132, a large amount of intake air flows to the deformable portion 136e immediately before the seal portion 136 comes into contact with the air intake port 2. In this case, pressure caused by the flow of intake air is likely to be applied to the seal portion curved portion 36a of the seal portion 136 and the seal portion curved portion 37a of the seal portion 137. Particularly, large force causing the turning over of the seal portions 136 and 137 is applied to a region (an upstream region in a case where the downstream side is negative pressure as illustrated in FIG. 17, and a downstream region in a case where the upstream side is negative pressure as illustrated in FIG. 18) (with which the flowing intake air collides) of the seal portion curved portion 36a of the seal portion 136 and of the seal portion curved portion 37a of the seal portion 137. In the seal portion curved portion 36a, the area S1 of the second deformable portion 136g and the third deformable portion 136h is reduced by reducing the sum (=L2+t1) of the length L2 of the second deformable portion 136g and the thickness t1 of the first deformable portion 136f to be less than the length L3 of the valve 132 at the location of the fixing portion 36d. For this reason, in a case where the downstream side is negative pressure as illustrated in FIG. 17, it is possible to reduce force that is applied from the upstream side to the second deformable portion 136g and the third deformable portion 136h. As a result, it is possible to prevent a case in which immediately before the seal portion 136 comes into contact with the air intake port 2, due to differential pressure, the second deformable portion 136g and the third deformable portion 136h are rolled up such that the side surface (positioned to face the valve body 35) of the second deformable portion 136g comes into contact with the inner wall surface 25 while the third deformable portion 136h does not come into contact with the inner wall surface 25. It is possible to prevent insufficient contact between the seal portion 136 and the air intake port 2.

The area S2 of the E2 side surface of the third deformable portion 136h in the seal portion curved portion 36a is reduced by reducing the protrusion length L4 of the third deformable portion 136h from the second deformable portion 136g to be much less than the length L1 of the first deformable portion 136f. For this reason, in a case where the upstream side is negative pressure as illustrated in FIG. 18, it is possible to reduce force that is applied from the downstream side to the third deformable portion 136h. As a result, it is possible to prevent a case in which immediately before the seal portion 136 comes into contact with the air intake port 2, due to differential pressure, the third deformable portion 136h is rolled up such that the E2 side surface of the third deformable portion 136h comes into contact with the inner wall surface 25 while the E1 side surface of the third deformable portion 136h does not come into contact with the inner wall surface 25. It is possible to prevent insufficient contact between the seal portion 136 and the air intake port 2.

Similarly, in the seal portion curved portion 37a of the seal portion 137 having the same configuration as that of the seal portion 136, the area S1 of the second deformable portion 137g and the third deformable portion 137h is reduced by reducing the sum (=L2+t1) of the length L2 of the second deformable portion 137g and the thickness t1 of the first deformable portion 137f to be less than the length L3 of the valve 132 at the location of the fixing portion 37d. For this reason, in a case where the upstream side is negative pressure as illustrated in FIG. 18, the rolling up of the second deformable portion 137g and the third deformable portion 137h, which is caused by differential pressure immediately before the seal portion 137 comes into contact with the air intake port 2, can be prevented. As a result, it is possible to prevent insufficient contact between the seal portion 137 and the air intake port 2. In a case where the downstream side is negative pressure as illustrated in FIG. 17, the rolling up of the third deformable portion 137h, which is caused by differential pressure immediately before the seal portion 137 comes into contact with the air intake port 2, can be prevented by reducing the area S2 of the E2 side surface of the third deformable portion 137h. As a result, it is possible to prevent insufficient contact between the seal portion 137 and the air intake port 2. The rest of the configuration of the second embodiment is the same as that of the first embodiment. That is, the valve 132 in the second embodiment can be used instead of the valve 32 of the air intake device 100 in the first embodiment.

Effects of Second Embodiment

In the second embodiment, it is possible to obtain the following effects.

In the second embodiment, the length (=L2+t1) of each of the deformable portions 136e and 137e in the turning direction (the direction E) of the valve 132 is less than the length L3 of each of the fixing portions 36d and 37d in the turning direction of the valve 132. For this reason, it is possible to reduce the area S1 of each of the deformable portions 136e and 137e. Accordingly, it is possible to reduce force which is applied to the deformable portions 136e and 137e due to the flow of intake air. As a result, it is possible to prevent substantial deformation of the deformable portions 136e and 137e. The deformable portions 136e and 137e can be prevented from coming into contact with the inner wall surface 25 of the air intake port 2 in a state where the deformable portions 136e and 137e are deformed into unintended shapes (rolled-up state). It is possible to reliably seal the gap between the air intake port 2 and the valve 132.

Other effects of the second embodiment are the same as those of the first embodiment.

Modification Example

It has to be considered that the embodiments disclosed here are illustrated as merely examples in all aspects, and this disclosure is not limited to the embodiments. The scope of this disclosure is described not only in the embodiments but also in the appended claims, and includes all changes (modification examples) made within the concept and scope equivalent to the appended claims.

For example, in the first embodiment, the air intake device 100 of this disclosure is applied to the in-line four-cylinder engine 10 for an automobile; however, this disclosure is not limited to that configuration. The air intake device of this disclosure may be applied to internal combustion engines other than automobile engines, and may be applied to internal combustion engines other than in-line four cylinder engines.

In the first embodiment, the valve 32 of this disclosure is used in the variable air intake control valve assembly 3 which changes the length of an intake air path; however, this disclosure is not limited to that configuration. The valves of this disclosure may be used in a variable air intake control valve assembly such as a resonant supercharging valve, an inertia supercharging valve, a tumble control valve (TCV) that generates a tumble flow, or a swirl control valve (SCV) that generates a swirl flow. That is, the valves of this disclosure may be used in any type of valve assembly of an air intake device. The valves of this disclosure are preferably used in a valve assembly of an air intake device that requires air tightness in a closed state of the valve. The valves of this disclosure may be used in a valve assembly of a device other than an air intake device insofar as the valve assembly switches between the flow passages of a fluid.

In the first embodiment, the curved body side end portions 35b and 35c of the valve body 35 are curved outward, and the seal portion curved portions 36a and 37a of the seal portions 36 and 37, which correspond to the curved side end portions 32b and 32c, are curved; however, this disclosure is not limited to that configuration. In this disclosure, the valve body may not be curved, and only the seal portion curved portion of each seal portion may be curved. Also, in this case, it is possible to increase geometrical moment of inertia by curving the seal portion curved portions disposed in the curved side end portions of the valve. As a result, the seal portion can be unlikely to be deformed.

Figure 19:
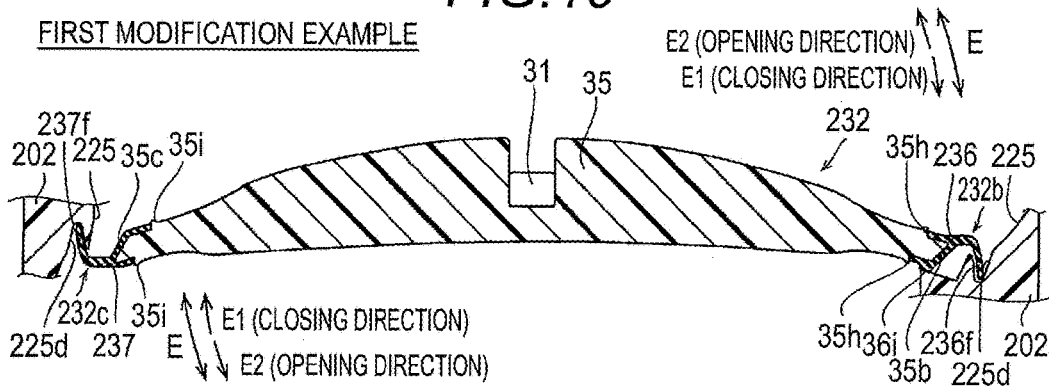
FIG. 19 is a sectional view illustrating a valve and an air intake port of the air intake device in a first modification example of the first embodiment disclosed here.

In the first embodiment, the seal portions 36 and 37 are respectively provided with the deformable portions 36f and 37f which extend toward the closing direction E1, and with the contact portions 36h and 37h which extend from the deformable portions 36f and 37f toward the opening direction E2. The contact portions 36h and 37h come into contact with the inner wall surface 25 of the air intake port 2. However, this disclosure is not limited to that configuration. This disclosure may have a configuration in which the seal portions are capable of coming into contact with the inner wall surface of the air intake port. For example, as in a valve 232 in a first modification example of the first embodiment illustrated in FIG. 19, seal portions 236 and 237 may be configured such that the connection portions 36g and 37g and the contact portions 36h and 37h of the embodiment illustrated in FIG. 7 are not provided, and deformable portions 236f and 237f come into contact with an inner wall surface 225 of an air intake port 202. In the first modification example, curved side end portions 232b and 232c of the valve 232 are also curved at a predetermined radius of curvature. In a case where the valve 232 of the first modification example is used in an air intake device, the inner wall surface 225 of the air intake port 202 is preferably provided with a recessed portion 225d into which the deformable portions 236f and 237f are inserted.

Figure 20:
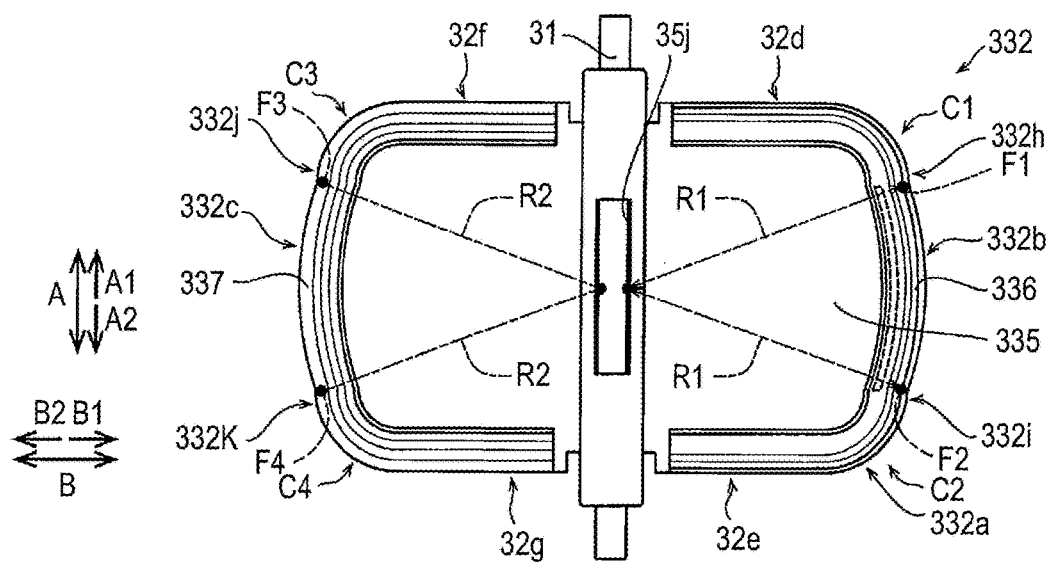
FIG. 20 is a top view illustrating a valve in a second modification example of the first embodiment disclosed here.

In the first embodiment, the curved side end portions 32b and 32c are formed such that the curved side end portions 32b and 32c are curved continuously from the rounded corners C1 to C4 of the side end portions 32a; however, this disclosure is not limited to that configuration. As in a valve 332 of a second modification example of the first embodiment disclosed here as illustrated in FIG. 20, curved side end portions 332b and 332c are formed in such a way as to be spaced away from the corners C1 to C4. In a side end portion 332a of the valve 332, a straight side end portion 332h is provided between one end portion F1 of the curved side end portion 332b, which is curved, and the corner C1 which is positioned on the A1 side and the B1 side, and a straight side end portion 332i is provided between the other end portion F2 and the corner C2 which is positioned on the A2 side and the B1 side. Similarly, a straight side end portion 332j is provided between one end portion F3 of the curved side end portion 332c, which is curved, and the corner C3 which is positioned on the A1 side and the B2 side, and a straight side end portion 332k is provided between the other end portion F4 and the corner C4 which is positioned on the A2 side and the B2 side. If the valve 332 is formed in this manner, it is also possible to increase the geometrical moment of inertia of a seal portion 336 in the curved side end portion 332b which is curved, and the geometrical moment of inertia of a seal portion 337 in the curved side end portion 332c which is curved. The valve 332 is formed by disposing the seal portions 336 and 337, which are formed into corresponding predetermined shapes, in a valve body 335 that is formed into the same shape as that of the valve 332 in a top view.

In the first embodiment, the curved side end portions 32b and 32c which are curved are provided in only the side end portions of the valve 32 which extend along the direction A of extension of the turning shaft 31; however, this disclosure is not limited to that configuration. In a valve of this disclosure, curved side end portions may be provided not only in side end portions extending along an extension direction of a turning shaft, but also in side end portions extending along a direction perpendicular to the turning shaft.

In the first and second embodiments, the curved side end portions 32b and 32c of the valve 32 (132) are curved outward; however, this disclosure is not limited to that shape. In this disclosure, each curved side end portion of a valve may be curved inward.

In the first and second embodiments, the curved side end portion 32b of the valve 32 (132), which is positioned on the B1 side, and the curved side end portion 32c, which is positioned on the B2 side, are curved outward; however, this disclosure is not limited to that shape. In this disclosure, only one side of a valve in the direction B (direction perpendicular to a turning shaft) may be curved, and the other side of the valve may be formed straight.

In the first embodiment, the seal portions 36 and 37 are provided in the valve body 35 via insert molding; however, this disclosure is not limited to that method. For example, seal portions may be disposed in a valve body by providing the seal portions separately from the valve body, and fitting the seal portions into the valve body.

In the second embodiment, the deformable portions 136e and 137e are respectively provided in only the seal portion curved portion 36a of the seal portion 136 and the seal portion curved portion 37a of the seal portion 137; however, this disclosure is not limited to that configuration. For example, deformable portions illustrated in FIGS. 15 to 18 may be provided in a portion of a seal portion other than a seal portion curved portion.

As a result of further study, in order to achieve the object, the inventors have come up with the following configuration. That is, an air intake device according to a first aspect of this disclosure includes: an air intake port; and a valve that includes an elastically deformable seal portion disposed in a side end portion, and switches between flow paths of the air intake port by being turned around a turning shaft. The side end portion of the valve is provided with a curved side end portion that extends from one end portion side to the other end portion side along an extension direction of the turning shaft while being curved.

In the air intake device according to the first aspect of this disclosure, as described above, the side end portion of the valve is provided with the curved side end portion that extends from the one end portion side to the other end portion side along the extension direction of the turning shaft while being curved. For this reason, it is possible to increase the geometrical moment of inertia of the seal portion in the curved side end portion which is curved, compared to that in a case where the side end portion of the valve is formed straight. Accordingly, it is possible to prevent deformation of the seal portion in the curved side end portion which is caused by external force induced by the flow of intake air flowing through the air intake port. As a result, it is possible to prevent the deformed seal portion from causing insufficient sealing between the air intake port and the valve. In addition, the curved side end portion is provided in a portion of the side end portion of the valve, which extends from the one end portion side to the other end portion side along the extension direction of the turning shaft. Accordingly, it is possible to prevent deformation of a portion (which is positioned along the extension direction of the turning shaft, and to which force caused by the flow of a fluid is likely to be applied) of the seal portion in the curved side end portion. In addition, since the seal portion can be elastically deformed, the seal portion disposed in the side end portion of the valve is capable of coming into close contact with the air intake port. As a result, in the air intake device, it is possible to sufficiently seal a gap between the air intake port and the valve.

In the air intake device according to the first aspect of this disclosure, it is preferable that the curved side end portion is curved outward while being separated from the turning shaft. In order for the valve to switch between flow paths of the air intake port, the valve is required to be shaped so as to correspond to the shape of an inner wall surface of the air intake port such that the valve is capable of closing the air intake port. As described above, the inner wall surface of the air intake port may be formed inward to correspond to the curved side end portion which is curved outward. Accordingly, it is possible to prevent a decrease in the diameter of the flow path (sectional area of the flow path) of the air intake port, unlike a case in which the curved side end portion is curved inward and the inner wall surface of the air intake port is formed outward to correspond thereto. As a result, it is possible to prevent an increase in the pressure loss of a fluid flowing through the air intake port.

In the air intake device according to the first aspect of this disclosure, it is preferable that a ratio of the radius of curvature of the curved side end portion to a width of the valve in the direction, in which the turning shaft extends, is set to two or less. In this configuration, it is possible to reliably increase the geometrical moment of inertia of the seal portion in the curved side end portion. As a result, it is possible to effectively prevent external force from causing deformation of the seal portion in the curved side end portion. Effects of the configuration have been confirmed via simulation.

In the air intake device according to the first aspect of this disclosure, it is preferable that the valve further includes a valve body with a body side end portion in which the seal portion is disposed, and the seal portion is disposed in a curved manner in a curved body side end portion of the valve body, which extends along the extension direction of the turning shaft while being curved, in the curved side end portion of the valve. As a result, it is possible to reduce complexity of the shape of the seal portion, and to easily form the curved side end portion in the side end portion of the valve.

In the air intake device according to the first aspect of this disclosure, it is preferable that the valve further includes a valve body with a body side end portion in which the seal portion is disposed, the seal portion includes a fixing portion fixed to the valve body, and a deformable portion that extends from the fixing portion while being separated from the valve body, and a length of the valve in a turning direction at the location of the deformable portion is shorter than the length of the valve in the turning direction at the location of the fixing portion. In this configuration, it is possible to reduce the area of the deformable portion. Accordingly, it is possible to reduce force which is applied to the deformable portion due to the flow of intake air. As a result, it is possible to prevent substantial deformation of the deformable portion. The deformable portion can be prevented from coming into contact with the inner wall surface of the air intake port in a state where the deformable portion is deformed into an unintended shape. It is possible to reliably seal the gap between the air intake port and the valve.

A valve according to a second aspect of this disclosure can be turned around a turning shaft and includes: an elastically deformable seal portion that is disposed in a side end portion of the valve. The side end portion of the valve is provided with a curved side end portion that extends from one end portion side to the other end portion side along an extension direction of the turning shaft while being curved.

In the valve according to the second aspect of this disclosure, as described above, the side end portion of the valve is provided with the curved side end portion that extends from the one end portion side to the other end portion side along the extension direction of the turning shaft while being curved. As a result, it is possible to prevent deformation of the seal portion in the curved side end portion which is caused by external force induced by the flow of the fluid.

The air intake device of the first aspect of this disclosure may adopt the following other configurations.

Supplementary Note 1

In the air intake device of the first aspect of this disclosure, it is preferable that a valve is formed into a rectangular shape, and curved side end portions are respectively formed in a pair of side end portions of the rectangular valve which extend along an extension direction of a turning shaft.

Supplementary Note 2

In the air intake device of the first aspect of this disclosure, it is preferable that a seal portion is shaped to radially protrude outward from the side end portion of the valve.

Supplementary Note 3

In this case, it is preferable that the valve further includes a valve body with a body side end portion in which the seal portion is disposed, and the seal portion has a deformable portion that radially protrudes outward from the side end portion of the valve.

Supplementary Note 4

In the air intake device in which the ratio of the radius of curvature to a width is two or less, it is preferable that the ratio (the radius of curvature/the width) of the radius of curvature of the curved side end portion to the width of the valve in the direction, in which the turning shaft extends, is set to one or less.

According to the aspects of this disclosure, as described above, it is possible to provide an air intake device and a valve which are capable of preventing deformation of a seal portion which is caused by external force induced by the flow of intake air or the like.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An air intake device comprising:
an air intake port; and
a valve that includes an elastically deformable seal portion disposed in a side end portion, and switches between flow paths of the air intake port by being turned around a turning shaft,
wherein the side end portion of the valve is provided with a curved side end portion that extends from one end portion side to the other end portion side along an extension direction of the turning shaft while being curved,
wherein the valve further includes a valve body with a body side end portion in which the seal portion is disposed,
wherein the seal portion includes 1) a fixing portion fixed to the valve body, 2) a restrict portion which protrudes from the fixing portion in a turning direction, 3) a first deformable portion that extends from the fixing portion while being separated from the valve body, 4) a second deformable portion that has a tapered shape and extends from the first deformable portion toward one side in the turning direction, and 5) a third deformable portion which extends from a side surface of the second deformable portion and forms an obtuse angle of less than 180 degrees with a first side of the side surface of the second deformable portion and an acute angle with a second side of the side surface of the second deformable portion,
wherein a length of the second deformable portion in the turning direction is shorter than total lengths of the fixing portion and the restrict portion in the turning direction.

2. The air intake device according to claim 1, wherein the curved side end portion is curved outward while being separated from the turning shaft.

3. The air intake device according to claim 1, wherein a ratio of the radius of curvature of the curved side end portion to a width of the valve in the direction, in which the turning shaft extends, is set to two or less.

4. The air intake device according to claim 1, wherein the seal portion is disposed in a curved manner in a curved body side end portion of the valve body, which extends along the extension direction of the turning shaft while being curved, in the curved side end portion of the valve.

5. The air intake device according to claim 1, wherein a length of the valve in the turning direction at the location of the first and second deformable portions is shorter than the length of the valve in the turning direction at the location of the fixing portion.

6. A valve that can be turned around a turning shaft, the valve comprising:
an elastically deformable seal portion that is disposed in a side end portion of the valve,
wherein the side end portion of the valve is provided with a curved side end portion that extends from one end portion side to the other end portion side along an extension direction of the turning shaft while being curved,
wherein the valve further includes a valve body with a body side end portion in which the seal portion is disposed,
wherein the seal portion includes 1) a fixing portion fixed to the valve body, 2) a restrict portion which protrudes from the fixing portion in a turning direction, 3) a first deformable portion that extends from the fixing portion while being separated from the valve body, 4) a second deformable portion that has a tapered shape and extends from the first deformable portion toward one side in the turning direction, and 5) a third deformable portion which extends from a side surface of the second deformable portion and forms an obtuse angle of less than 180 degrees with a first side of the side surface of the second deformable portion and an acute angle with a second side of the side surface of the second deformable portion,
wherein a length of the second deformable portion in the turning direction is shorter than total lengths of the fixing portion and the restrict portion in the turning direction.

* * * * *